United States Patent Office 3,461,173
Patented Aug. 12, 1969

3,461,173
PREPARATION OF SUBSTITUTED
o-NITROPHENOLS
Henry J. Peterson, Wilmington, Del. assignor to Sun Oil
Company, Philadelphia, Pa., a corporation of New
Jersey
No Drawing. Filed Nov. 12, 1963, Ser. No. 323,069
Int. Cl. C07c 37/00, 79/26
U.S. Cl. 260—622                                      4 Claims This invention relates to a method for preparing substituted o-nitrophenols. More particularly this invention relates to a method for preparing substituted o-nitrophenols having the general formula

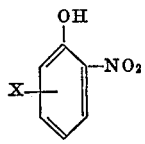

wherein X is a radical selected from the group consisting of hydroxyl and chlorine. Substituted o-nitrophenols having the above general formula find particular utility as bactericides and fungicides. They are also useful in the prevention of microbiological deterioration during leather manufacture, prevention of storage rot in tubers and as intermediates in the preparation of anti-tubercular drugs.

Heretofore these types of compound have been prepared by a variety of methods including (1) the direct nitration of dihydroxy benzenes, and (2) the nitration of the monobenzoate esters of dihydroxy benzene followed by hydrolysis. These methods, however, have the disadvantages attendant with the handling of strongly acidic materials and also require closely controlled conditions to insure the production of any appreciable yield of desired product. In addition, polynitration tends to occur and a multiplicity of isomers are generally formed in lieu of a single product.

A method has now been found wherein a substituted o-nitrophenol having the general formula

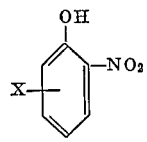

can be prepared using a halogenated nitrobenzene as the starting material.

According to the instant invention a mono-chlorinated nitrobenzene is contacted with a weight percent excess of powdered potassium hydroxide at a temperature in the range of 0° to 100° C. for a period of time in the range of 0.1 hour to 72 hours. For optimum conversion and yield it is preferred that the temperature employed be in the range of 20° to 90° C.

It is preferred that the mono-chlorinated nitrobenzene be dissolved in an inert solvent such as benzene, toluene, or a saturated aliphatic hydrocarbon such as n-hexane prior to contacting with the powdered potassium hydroxide in order that a better contacting between the mono-chlorinated nitrobenzene and the powdered potassium hydroxide be effected.

It is important in the practice of this invention that the mono-chlorinated nitrobenzene be contacted with a weight percent excess of powdered potassium hydroxide. The weight ratios of powdered potassium hydroxide to halogenated nitrobenzene which can be employed are in the range of from 2:1 to 25:1, preferably 3:1 to 15:1.

In the instant process water is formed as a by-product. Apparently since the instant products are not obtainable using aqueous potassium hydroxide, in the absence of a weight percent excess of powdered potassium hydroxide, the water of reaction would tend to deactivate the powdered potassium hydroxide by some mechanism such as by the formation of hydrates. Thus, if an amount of powdered potassium hydroxide less than that specified herein is used, little or none of the desired products are obtained.

After the mono-chlorinated nitrobenzene has been contacted with the powdered potassium hydroxide at a temperature and a for a period of time as specified above, the reaction mixture contains a multiplicity of products including mono-chlorinated nitrophenol in the form of its potassium salt and unreacted mono-chlorinated nitrobenzene and potassium hydroxide.

If a mono-chlorinated nitrophenol is the desired product, to the reaction mixture there is added an amount of water sufficient only to form a concentrated potassium hydroxide solution in which the solid potassium salts of the mono-chlorinated nitrophenols are insoluble. Care must be taken when adding the water to the reaction mixture so that the temperature generated by the heat of solution when dissolving potassium hydroxide in water does not exceed about 50° C. This can conveniently be accomplished by the use of ice water or through external cooling means. The salts of the mono-chlorinated nitrophenols are then separated by filtration, dissolved in water, and upon acidification of the aqueous solution with a mineral acid, the mono-chlorinated nitrophenols are precipitated. The precipitated products are then separated and recovered. Alternatively the mono-chlorinated nitrophenol products can be obtained from the reaction mixture by the addition thereto of an amount of water sufficient to solubilize both the potassium hydroxide and the potassium salts of the mono-chlorinated nitrophenols. Here again the addition of the water must be controlled so that the temperature of the solution does not exceed about 50° C. Any unreacted mono-chlorinated nitrobenzene is removed from the solution by extraction with a convenient solvent such as ether, benzene, or saturated aliphatic hydrocarbons such as hexane. Upon acidification of the aqueous phase with a mineral acid the mono-chlorinated nitrophenol is precipitated and separated and recovered.

If the dihydroxynitrobenzene is the desired product the method of work up of the reaction mixture is similar to either of the methods described in the paragraph next preceding with the exception that when the reaction mixture is dissolved in water it is necessary that the temperature of the resulting solution exceed 50° C. and be at least 60° C. Generally it has been found that the heat of solution of the reaction mixture will be sufficient to raise the temperature thereof sufficiently high to insure the production of the dihydroxynitrobenzene.

It is preferred that in the work up of the separate products from the reaction mixture that the temperature of the solution be in the range of 20° C. to 40° C. when the mono-chlorinated nitrophenol is the desired product and the temperature of the solution be in the range of 60° C. to 90° C. when the dihydroxynitrobenzene is the desired product.

The following examples further illustrate the instant invention.

Example I

Into 200 ml. of benzene there were placed 10 grams of parachloronitrobenzene. The mixture was warmed on a steam bath to facilitate solution and then allowed to cool to room temperature. The cooled solution was poured over about 100 grams of freshly powdered potassium hydroxide contained in a porcelain dish. The reaction mixture was mixed until the powdered potassium hydroxide was thoroughly wet with the solution. The reaction mixture was placed in a desiccator overnight at ambient temperature (20° C.) to permit the reaction to proceed. The reaction mixture was then dissolved in about 500 ml. of ice water. At no time did the temperature of the solution exceed 50° C. The resulting solution was extracted with 200 ml. portions of diethyl ether. The aqueous phase was acidified by the dropwise addition thereto of concentrated hydrochloric acid. The precipitated material was recovered by filtration. The product had a melting point of 40°–41.5° C. (uncorrected) as compared with a literature value of 41° C. for 3-chloro-6-nitrophenol.

Example II

Example I was repeated except that after standing overnight in a disiccator at ambient temperature the reaction mixture was dissolved in about 500 ml. of ambient temperature water. The heat of solution raised the temperature to about 80° C. After extraction and acidification the precipitated material was recovered by filtration. The product had a melting point of 118°–120° C. (uncorrected) as compared with a literature value of 122° C. for 6-nitroresorcinol.

When other mono-chlorinated nitrobenzenes are substituted for p-chloronitrobenzene in the above examples, substantially analogous results are obtained.

I claim:

1. Method for preparing mono-chlorinated o-nitrophenols which comprises contacting a nono-chlorine substituted nitrobenzene with powdered potassium hydroxide wherein the weight ratio of powdered potassium hydroxide to halogen substituted nitrobenzene is in the range of from 2:1 to 25:1 at a temperature in the range of 0° C. to 100° C. for a period of time in the range of 0.1 hour to 72 hours, whereby the mono-chlorine substituted nitrophenol is converted to the mono-potassium salt of mono-chloronitrophenol, adding water to the reaction mass at a temperature in the range of 0° C. to 50° C., acidifying the resulting solution and thereafter separating and recovering said mono-chlorinated o-nitrophenol product.

2. Method in accordance with claim 1 wherein the water is added to the reaction mass at a temperature in the range of 20° C. to 40° C.

3. Method for preparing 3-chloro-6-nitrophenol which comprises contacting parachloronitrobenzene with powdered potassium hydroxide wherein the weight ratio of powdered potassium hydroxide to halogen substituted nitrobenzene is in the range of from 2:1 to 25:1 at a temperature in the range of 0° C. to 100° C. for a period of time in the range of 0.1 hour to 24 hours, whereby the parachloronitrobenzene is converted to a monopotassium salt of parachloronitrophenol, adding water to the reaction mass at a temperature in the range of 0° C. to 50° C., acidifying the resulting solution, and thereafter separating and recovering said 3-chloro-6-nitrophenol.

4. Method in accordance with claim 3 wherein the water is added to the reaction mass at a temperature in the range of 20° C. to 40° C.

No references cited.

BERNARD HELFIN, Primary Examiner

W. B. LONE, Assistant Examiner